United States Patent
Shaw et al.

(10) Patent No.: US 11,972,372 B2
(45) Date of Patent: Apr. 30, 2024

(54) UNIFIED TRAVEL INTERFACE

(71) Applicant: SERKO LIMITED, Auckland (NZ)

(72) Inventors: Robert James Shaw, Auckland (NZ); Darrin John Grafton, Auckland (NZ)

(73) Assignee: SERKO LIMITED, Auckland (NZ)

( * ) Notice: Subject to any disclaimer, the term of this patent is extended or adjusted under 35 U.S.C. 154(b) by 571 days.

(21) Appl. No.: 16/919,982

(22) Filed: Jul. 2, 2020

(65) Prior Publication Data
US 2020/0334590 A1 Oct. 22, 2020

Related U.S. Application Data

(60) Division of application No. 15/906,091, filed on Feb. 27, 2018, now abandoned, which is a continuation of application No. 14/759,453, filed as application No. PCT/NZ2014/000003 on Jan. 9, 2014, now abandoned.

(30) Foreign Application Priority Data

| Jan. 9, 2013 | (NZ) | 605545 |
| Jan. 14, 2013 | (NZ) | 605725 |
| Nov. 19, 2013 | (NZ) | 617953 |
| Nov. 19, 2013 | (NZ) | 617955 |

(51) Int. Cl.
*G06Q 10/00* (2023.01)
*G06Q 10/02* (2012.01)

(52) U.S. Cl.
CPC .......... *G06Q 10/025* (2013.01); *G06Q 10/02* (2013.01)

(58) Field of Classification Search
USPC ........................................... 705/5
See application file for complete search history.

(56) References Cited

U.S. PATENT DOCUMENTS

| 5,948,040 A | 9/1999 | Delorme et al. |
| 2002/0016724 A1 | 2/2002 | Yang et al. |
| 2003/0023463 A1* | 1/2003 | Dombroski ............ G06Q 10/02 705/5 |
| 2003/0177045 A1 | 9/2003 | Fitzgerald et al. |
| 2005/0114167 A1* | 5/2005 | McEvoy ................ G06Q 10/02 705/26.1 |

(Continued)

FOREIGN PATENT DOCUMENTS

WO WO-2005079425 A2 * 9/2005 ............. G06Q 10/02

OTHER PUBLICATIONS

House of Travel, Aug. 29, 2012, <http://web.archive.org/web/20120829221840/http://www.houseoftravel.co.nz/home.htm>.

Primary Examiner — Tonya Joseph
(74) Attorney, Agent, or Firm — NIXON & VANDERHYE

(57) ABSTRACT

A travel booking system abstracts the user from a travel search of web and internet searches initiated by the user and the search result of those searches to present the user with a consistent interface for both entry and results. As part of the abstraction the search introduces elements of one or more traveller profiles to delineate the searches. The user may investigate the search results for a trip or alternate route options returned by a search to further direct the search or to book a search result and when a booked itinerary is returned may load this to a traveller's device together with other assistance for phases of the trip.

20 Claims, 6 Drawing Sheets

(56) References Cited

U.S. PATENT DOCUMENTS

| | | | |
|---|---|---|---|
| 2007/0073562 A1* | 3/2007 | Brice | G06Q 10/02 |
| | | | 705/5 |
| 2008/0082373 A1* | 4/2008 | Durocher | G06Q 30/00 |
| | | | 705/6 |
| 2009/0171899 A1* | 7/2009 | Chittoor | G06Q 10/02 |
| 2009/0210262 A1 | 8/2009 | Rines et al. | |
| 2010/0305984 A1* | 12/2010 | Ben-Yitschak | G06Q 10/025 |
| | | | 707/769 |
| 2011/0054957 A1 | 3/2011 | Drefs et al. | |
| 2011/0258006 A1* | 10/2011 | Koetting | G06Q 30/06 |
| | | | 705/5 |
| 2011/0307280 A1 | 12/2011 | Mandelbaum | |
| 2013/0054375 A1* | 2/2013 | Sy | G06Q 50/14 |
| | | | 705/14.66 |
| 2013/0304526 A1* | 11/2013 | Boyd | G06Q 10/02 |
| | | | 705/5 |
| 2013/0339341 A1* | 12/2013 | Fan | G06Q 10/02 |
| | | | 707/E17.014 |
| 2014/0114705 A1 | 4/2014 | Bashvitz et al. | |
| 2016/0203422 A1* | 7/2016 | Demarchi | G06F 16/29 |
| | | | 705/6 |

\* cited by examiner

UNIFIED TRAVEL INTERFACE

TECHNICAL FIELD

The invention generally relates to the provision of a system for booking travel, travel management and travel booking monitoring for travel and for associated products or services via the internet, whether by website or a hosted application.

More particularly the invention relates to the providing an assistant to the booking process which will implement a provider independent uniform interface for all aspects of the booking process including monitoring post booking.

BACKGROUND ART

Booking travel, or items associated with travel such as accommodation, taxis, cars, restaurants, air travel, etc. is usually carried out via a user on an internet site or a booking agent using either an internet site or a client interface to a hosted application. There is a continuing trend for persons booking travel or other products or services associated with travel to book themselves rather than to book using a travel agent, whether or not that agent provides access via the internet. In booking travel usually an internet site handles just one aspect of travel, for instance booking a rental car, although some sites will handle booking an airline trip, accommodation at a destination and a rental car at the destination—but usually for just one airline or airline alliance, and for a limited range of accommodation sites and rental car companies.

Usually while doing this a user has to handle several different interfaces for the different modes of travel or accommodation and may have to deal with different interfaces for each different accommodation site or rental company. There is the additional problem of using whatever loyalty or rewards scheme a particular company has created and either claiming the reward for that part of a trip after the fact or trying to do it while putting together what may be a complex trip.

This results in user frustration because it becomes a challenge to deal with each different interface, to ensure that the service or product available is what is required, to make sure that dates and times of one service ties in with every other.

Additionally trying to manage or monitor the eventual travel and accommodation bookings requires that the user return to the individual sites where the bookings were created.

The present invention provides a solution to this and other problems which offers advantages over the prior art or which will at least provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

A reference to an "ERP" is a reference to an Enterprise Resource Planning system including at least an accounting system and a corporate travel planning system including itinerary planning and expenditure capability.

SUMMARY OF THE INVENTION

In one embodiment the invention consists in a travel booking system for booking a trip for a traveller, the travel booking system providing to the user a consistent interface for receiving the travel phases of the travel origin, the travel destination, any required waypoints between the two, any required facilities at travel origin, at travel waypoints, during travel between travel waypoints or at travel destination and any time requirements of the travel phases; the travel booking system responding to the travel phases and time and facility requirements to query travel providers having disparate interfaces and outputs and to provide at least one solution to each phase of travel presenting to the user the at least one solution for each phase in a consistent interface.

Preferably the travel booking system has access to a traveller profile identifying established traveller requirements for different required facilities and provides these as a filter to the booking process.

Preferably where the user is a corporate user the travel booking system has access to a corporate profile establishing corporate requirements for different required facilities and provides these as a filter to the booking process.

In an alternate embodiment the invention relates to a travel booking system for receiving a travel request including information on travel origins, travel destination, travel waypoints; facilities required at origin, waypoints or destinations and any required times at origin, destination or waypoints, the travel booking system determining solutions for each phase of the travel by searching disparate internet connected sites, receiving solution data from the disparate internet connected sites, resolving the data received from the disparate sites to a consistent format and outputting the data in a consistent format as one or more solutions to the travel request.

Preferably wherein each of the travel requests includes a weighting for each of the requirements, the weighting determining the relevance of each requirement in the ordering of the solutions.

In yet a further embodiment the invention relates to travel booking equipment programmed to receive a travel request from a user including information on travel origins, travel destination, any travel waypoints; any facilities required at origin, waypoints or destinations and any required specific times at origin, destination or waypoints, the travel booking equipment program determining solutions for each phase of the travel by searching disparate internet connected sites, receiving solution data from the disparate internet connected sites, resolving the data received from the disparate sites to a consistent format and outputting the data in a consistent format to the user as one or more solutions to the travel request.

Preferably any travel request information from the user is augmented by profile information relevant to the travel request and stored in at least one profile store accessible to the travel booking equipment.

Preferably profile information relevant to the travel request is stored in at least one individual traveller profile.

Preferably an individual traveller profile is stored in a social site profile.

Preferably profile information is stored in a corporate profile.

DESCRIPTION OF THE INVENTION

With a move to online booking of travel and travel associated products or services via web sites or internet connected applications rather than booking via a travel agent (whether online or not) there is an increasing requirement to provide simpler booking for online bookers and their traveller(s).

Often different items are booked at different web sites, with each web site having its own paradigm displaying information in its own way and following its own booking routine. Even where a site such as an airline provides ancillary processes for booking other items, such as rental cars or accommodation the interface for the rental car booking or the accommodation booking may have little relationship to the airline travel booking process.

Where the product or service is a lower volume item, for instance a cruise booking or a river rapids trip, the interface is likely to be individualistic and to require some time to appreciate and possibly more time to locate the cost of the service. This results in potential confusion for the user.

Figure 1:
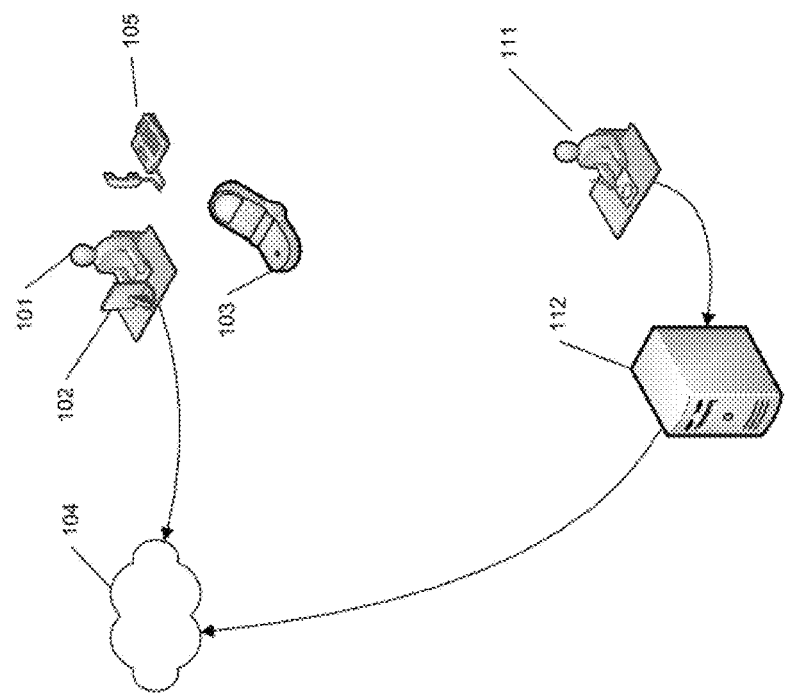
FIG. 1 is a general illustrative view of a normal travel booking process.
Figure 1:
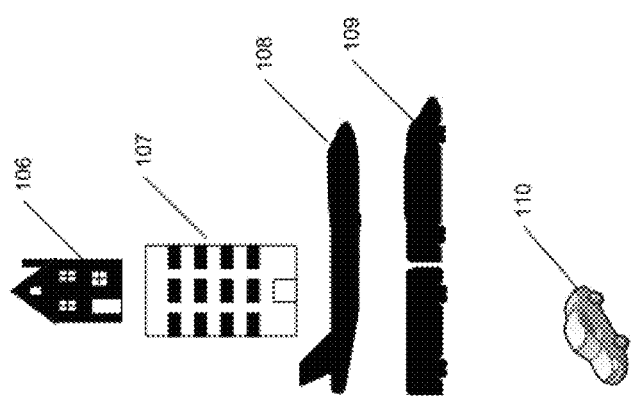

Typically, as shown in FIG. 1 a user 101 at a desk PC 102 or mobile phone 103 may book via the internet 104 accommodation at such as a motel 106 or a hotel 107. They may also book travel via such as an airline 108, a train 109 or a rental car 110. Alternatively they may telephone via phone 105 a travel agent 111 who may book via a corporate network 112 the same services using either the same web sites or a travel dedicated application. In each case the travel typically involves one or more searches to find travel and facilities which most nearly match the user requirements.

A typical trip consists of various phases of Travel, Stay, Eat, Work, Play and Rest. Assuming a typical overseas trip the journey will consist of travelling to an airport, travel to a destination airport which may involve transfers, travel from the destination airport to the actual destination, and work or rest at the destination. Each of the phases of Travel may have to be separately booked, as may the phases of Stay (as at an airline transfer lounge) Eat (at a restaurant) Rest (at a hotel) or Play (as at a gymnasium). Again typically each of these normally requires booking via a different web site or through a different web service with each having a totally different interface, and much time can be wasted coming to terms with each different interface. Worse is that some of the phases may require web searches to determine what facilities exist at a certain destination, and where they are in relation to other facilities, for instance the location of a gym relative to a motel.

The present invention provides a user interface to a travel search and booking engine which extracts or inserts parameters to guide the search engine in a search for travel available from an origin to a destination. It is necessary that the search engine have access to web services and web sites provided for booking travel or facilities used during travel and that it be capable of extracting information from these services or sites in order to present results of any search to a user in a consistent manner. The search engine, in providing results, should weight them in regard to how closely they approach the original requirements. Since the requirements may be complex the original requirements may include some weighting parameters to assist in the final weighting.

Many travel related services provide API's (Application Programming Interfaces) to access web services and receive information from these services. Some API's provide the ability to book via a web service. Necessarily where a site covers many different facilities (airlines, cruises, accommodation, car rental, game park visits, theme park visits) the API is complex and does not include all providers of these facilities. Additionally some of the services cover extremely niche markets and the work required to create a web service to access the API is not inconsiderable. Examples of some publically available complex travel API's are those of Sabre, Amadeus, Serko and Travelport.

With the availability of the internet it is now feasible to search for and to extract information on facilities within a particular area or over a particular route with reasonable reliability and this in combination with the use of the more common API's allows a search engine to access enough data to return valid information allowing a choice of facilities and further to book such facilities where there is a booking service available or if the service is a web site it follows one of the established booking patterns.

Figure 2:
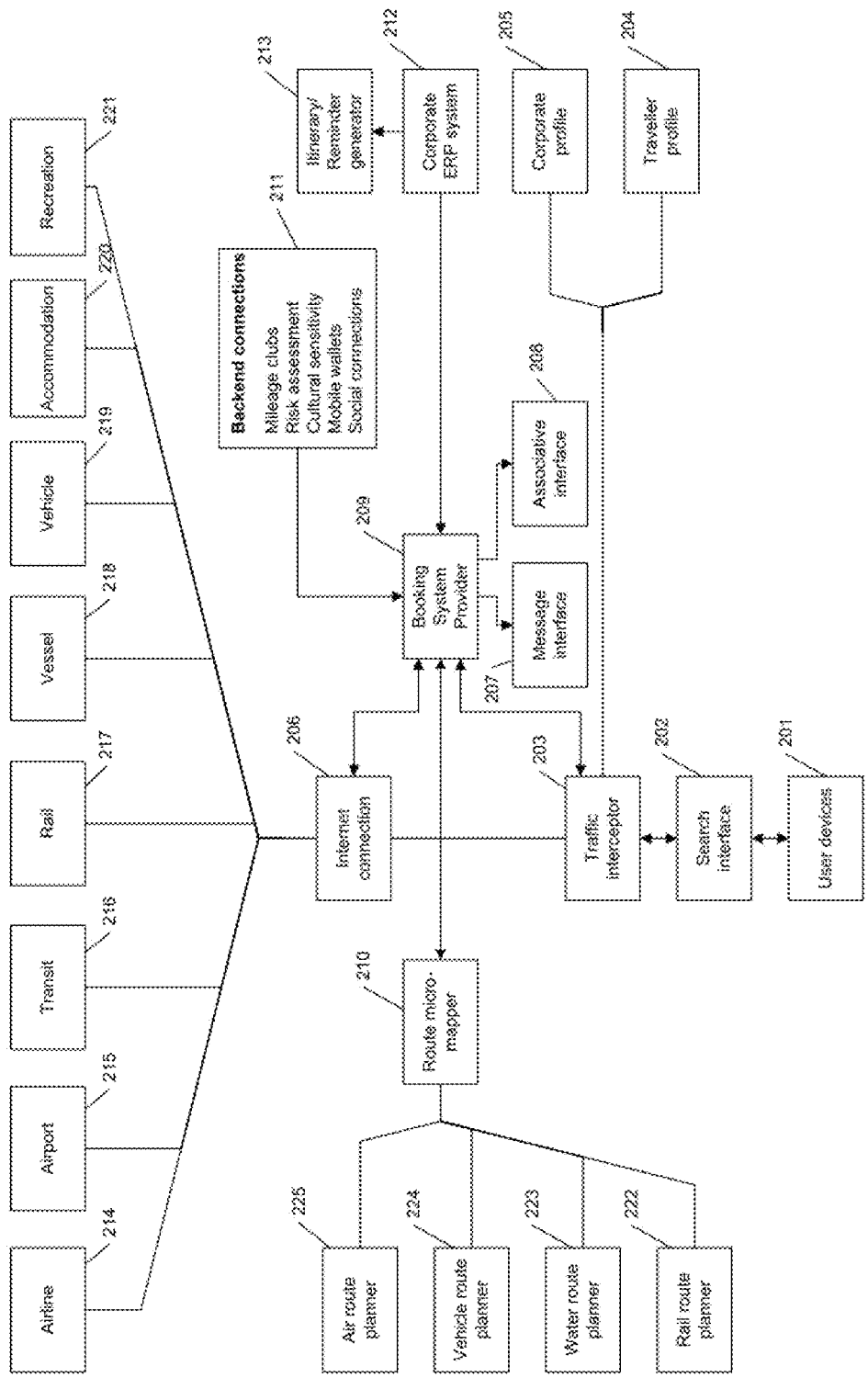
FIG. 2 is a diagram of the procedures which combine to extract information for choosing travel and options.

In order to do this FIG. 2 shows the basics of a system for deriving data, presenting the required information and booking as necessary. A user or traveller with a device at 201 (laptop, PC, smartphone, tablet) having entered their user ID accesses a search interface 202 which connects to an internet connection 206 via a traffic interceptor 203. The search interface creates a search which accesses one or more travel suppliers API's or web sites. Typically these will be air travel suppliers because most travel searches start with an air travel search, and searches are made for the travel the traveller requires. The traffic interceptor derives the search parameters from the through traffic and begins to provide assistive parameters and information to help the traveller in finding the best travel route and transport combination for the desired trip. To do this it initially uses information from the traveller profile 204 and/or the corporate profile 205 if the traveller is a corporate traveller. The data from these assists in refining what is returned to the traveller from the search, for instance if an airline sector no longer has seats in business class for that flight on that day and the corporate policy is to always fly business class then that flight on that sector, and possibly that airline for that route, will not be returned as one of the choices for the traveller.

It can be seen that the user is abstracted from the actual search with the result that complications which would complexify the search are much reduced, Connected to the traffic interceptor is a booking system provider 209 which provides assistance by querying through the internet connection 206 for information related to what the traveller is querying for. Thus for a multi-sector air trip it may query transit items 216 which consists of searches specially crafted to provide information on transit conditions at the airport(s) through which the traveller would be transiting. Where the corporation or traveller profile shows that the traveller has airline lounge access to one of the airline lounges at that transit airport this information would be shown on an associative interface 208 of the display adjacent to the search interface section which shows search results.

Similarly the booking system provider 209 has backend connections to information which either relates to risks to which the traveller may be exposed or to information which will be used at the time any booking is finally made. This may include warnings where the traveller is transiting or has a destination in a country or part of a country about which an avoidance warning has been issued, or about any special culturally sensitive items such as a requirement for hair covering in females.

The booking system provider may additionally call on a route micro-mapper 210 which given the available information on the origin, travel waypoints and destination allows the micro-mapper to research the available routes and transport options available on these routes. Thus the micro-mapper may map any available routes from the travellers known home address to the nearest international airport, from the airport to a required waypoint, from there to the international airport nearest the destination, from the airport to the nearest rail station, from that rail station to the one closest to the destination, and the taxi route to the destination.

In doing this the route micro-mapper consults rail route planner 222, water route planner 223, vehicle route planner 224 and air route planner 225. These planners formulate routes as possible between the points it is initially given by a known "shortest route, shortest time" algorithm to arrive at segments of travel by particular travel methods. In arriving at these routes the planners will consider information from the relevant user or corporate profiles for preferred airlines, taxi, rail, car or boat transport providers before it considers other possibilities. This information may include weightings for various factors used in formulating the trip, for instance in corporate use a weighting for cost may be balanced against a weighting for the role of the traveller, to ensure that the managing director does not travel economy class. The information from the profiles may be used as a filter to restrict either the search or the returned information to display only that which meets the profile requirements, for instance a wheelchair traveller may not be shown flights on aircraft where the centre aisle includes a wing spar obstruction.

Once having derived possible routes the booking system provider 209 queries the appropriate service or web site at 214, 215, 217,218, 219 for available transport closest to the required date and time until it finds one or more routes with transport on those routes which will meet the times required by the original input. These routes and time may differ from those located by the travellers initial search and would appear in the associative interface as suggestions. The traveller may adopt one of these suggestions simply by clicking it, when it will replace any solution for that sector or sectors of travel.

Besides booking travel, such as airline, rail or bus the traveller may book a rental car at a waypoint or destination, the booking system provider 209 again interceding by providing a crafted search of vehicle providers at 219 to produce suggestions in associative interface 208. Similarly accommodation may be searched and adopted by crafted searches at 220 and recreational items by a search through item 221.

Sectors of travel, accommodation, etc may be adopted by the traveller as the travel booking process advances, and such sectors may appear in a status bar on the display.

When a trip is finally adopted in full the booking systems provider 209 confirms that the expense parameters of the trip meet the requirements of any corporate ERP (Enterprise Resource Planning) system 212, that any corporate policies have been adhered to, that the traveller has been advised of any risks and has accepted them, and then books the various sectors of the trip including any accommodation or any recreational items chosen by the traveller. It may at the same time update any loyalty or reward schemes falling within the trip and expend or update any traveller mobile wallets as necessary using backend connections 211. If this is a corporate trip any booked items which are seen by the system as personal are charged back to the traveller by the corporate ERP system.

Once the trip is booked it creates and stores an itinerary at 213 as well as loading it to any relevant device of the traveller. This itinerary will include reminders for specified events within the trip, such as hotel book-out times, airport travel reminder times, meeting times, etc. Other things which are loaded to the travellers device with the itinerary are those items which will provide assistance on the trip, including an app for locating car spaces at airport parking, and remembering the parking space, storage of electronic boarding passes for the airports, airport maps either as still images or as interactive maps, directions on how to reach a hotel from an airport, how to transit from one part of an airport to another, storage of bag tag details, capture of receipt details for corporate proof of purchase.

The system which created the bookings may also be used to access and review these created bookings, typically by using the trip or service reference of the individual sectors of a trip to query the service provider. Equally it is possible to retrieve the details of a trip and monitor the completion of each sector of a trip by querying the service provider, again by a consistent interface.

The interface shown to the traveller for carrying out the search will always be the same for a particular facet of a travel search, and the results returned will always be in the same format as the booking system provider 209 intercedes and queries one or more web services and collates the results as well as querying established web sites and scraping the results, returning an ordered list for the travellers viewing. In a similar manner the booking system provider may carry out an ancillary search at the traveller's destination or waypoint for accommodation or transport if this is indicated as being required and will display results found in the associative interface 208. The process of querying web service API's is well known as is the process of querying a web site and extracting results from that query for further interrogation or display. The booking system provider 209 systematically deals with the process of converting the information from the traveller input interface to the disparate input interfaces of API's or web sites, and processing the information from the disparate results into a standard format for the traveller display interface.

Preferably the interface is based on display templates for each facet of a travel search and for each set of results returned from a travel search. Such templates may be XML documents to allow consistency in building them.

Figure 3:
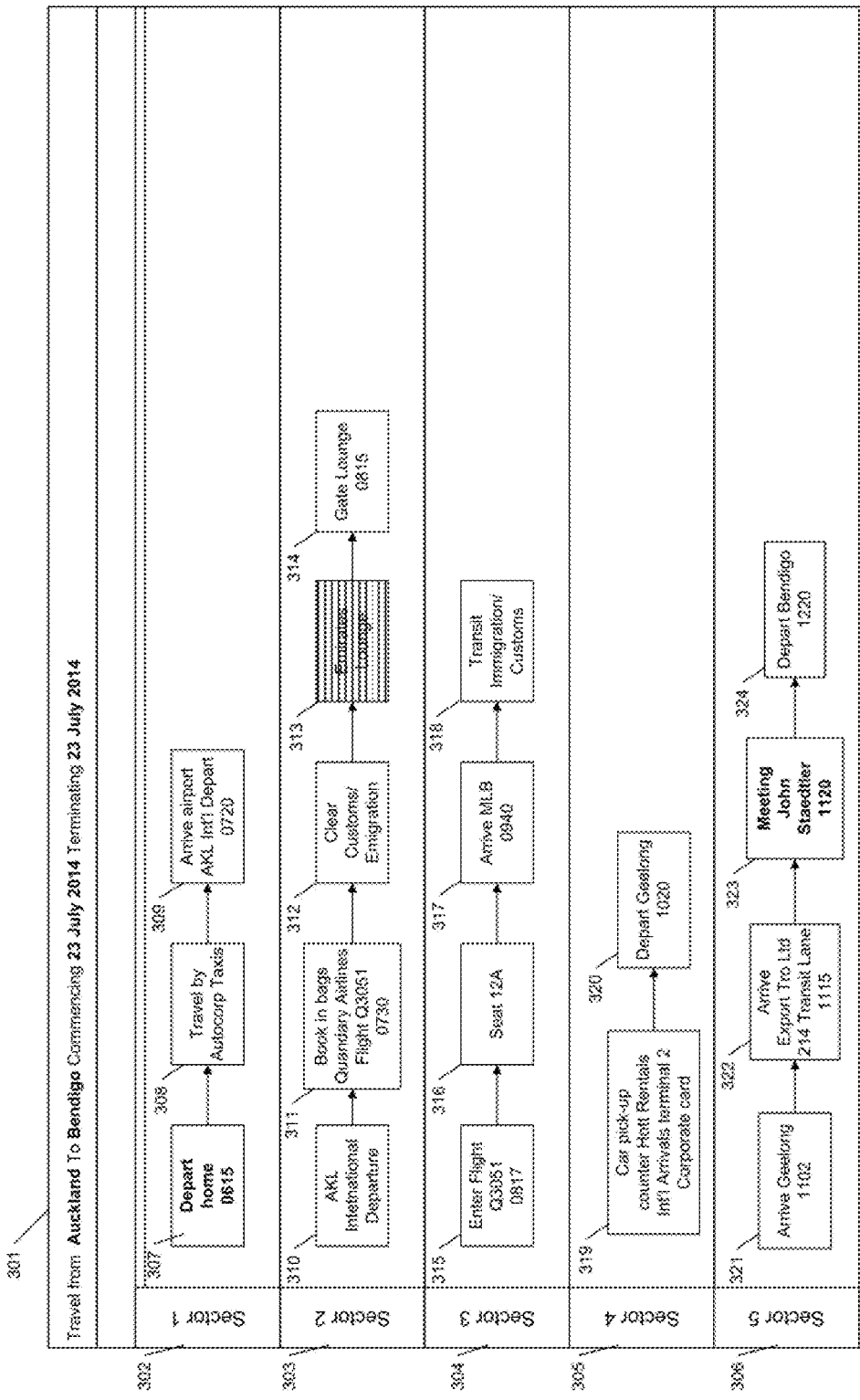
FIG. 3 is a sector chart of a typical trip as booked by the process.

FIG. 3 demonstrates a possible manner in which travel data may be presented to a traveller for acceptance before booking. As label 301 indicates the travel is from Auckland New Zealand to Bendigo Australia on the 23 Jul. 2014. The trip is presented broken into 5 sectors, 302, 303, 304, 305, 306 each in a different travel environment. Boxes 307 and 323 are bolded, representing the sole information besides the origin, destination and date originally entered by the user. Box 313 is banded indicating that this data was present in the users or corporate profile.

Sector 1 (302) requires a departure 307 from the travellers home at 0615. The traveller travels at 308 by Autocorp Taxis, chosen by price and past reputation to arrive at Auckland international departures (309) at 0720, the time being arrived at from a likely maximum for travel from the traveller's home at that time of the morning, as calculated from a mapping utility.

Sector 2 (303) demonstrates the sector from arrival at Auckland departures (310) through booking in (311) to flight Q3051 by 0730 through to clearance at Customs and Emigration (312) after which the traveller may retreat to Emirates lounge (313) until required to appear at the gate lounge (314) at 0815.

In Sector 3 (304) the traveller enters the flight at 0817 (315) and takes seat 12A (316) taken as the travellers profile expressed a preference for a window seat. The aircraft is supposed to arrive in Melbourne at 0940 local time (317) and the traveller may then transit immigration and customs.

Sector 4 (305) covers the pickup of a rental car at 319 and a subsequent departure to Geelong (320) at an estimated time of 1020. This time includes an exigency of 20 minutes to allow for consistent lateness in the arrival of the airline on this route in this season.

Sector 5 (306) includes at 321 the arrival of the traveller at Geelong, an arrival at the firm being visited (322) at 1115 for a meeting (323) at 1120. After the meeting (324) the traveller departs Bendigo for whatever sector is next.

While the trip shown covers only five sectors of travel the system is capable of planning a complete itinerary of many sectors which includes travel by any mix of air, sea, rail, vehicle with accommodation interspersed at waypoints or the final destination, booking for restaurants made at waypoints or the final destination, recreational bookings at any place.

Figure 4:
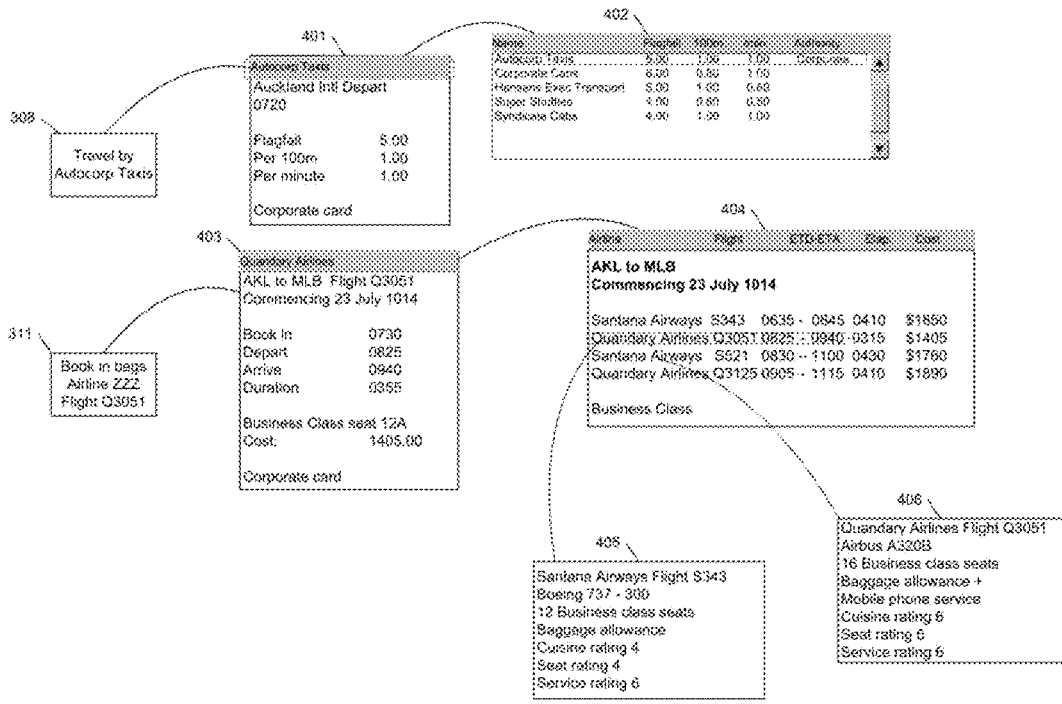
FIG. 4 is a demonstration of the ability to click down into the sector chart for information.

FIG. 4 shows the ability to dig deeper into the data of a listed route, accessible by JSON on the web listing of the sectorised route. Clicking on the content of FIG. 3 box 308 produces at 401 the booking information for the trip with Autocorp Taxis. Clicking this information produces box 402, the list of the highest rated options for the taxi ride and the rates of the firms concerned. Similarly clicking box 311 produces the trip information for Flight Q3051 at 403 and clicking that information provides at 404 the list of highest rated flight options for that portion of the trip. In turn clicking on these flights provides at 405, 406 further information on the flights and the booking system providers estimation of the facilities.

Figure 5:
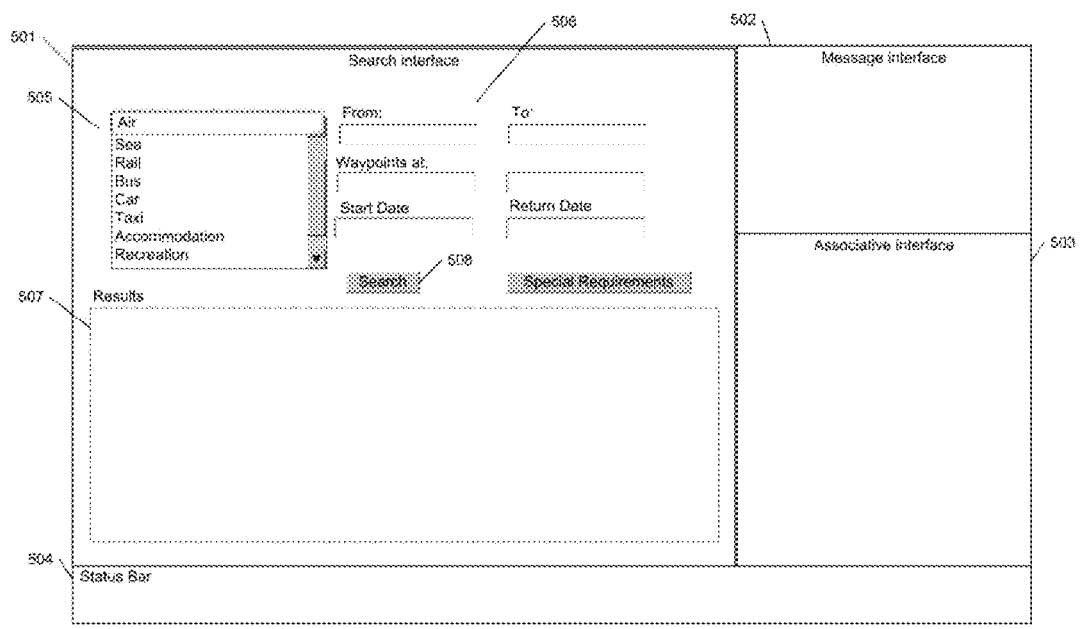
FIG. 5 is a view of the traveller interface screen.

FIG. 5 Shows a possible version of the user interface in which part 501 provides the user search interface, part 502 a message interface, mainly for risk warnings, part 503 an associative interface for information associated with whatever search the user is currently carrying out and part 504 a status bar carrying information on what sectors of travel related to this search have been adopted by the user.

Search interface 501 contains a selection menu 505 for a service, with mutable input boxes 506 providing information relative to the menu choice. Once information is entered in the input boxes a Search button 508 may be clicked to perform a search producing selectable results in result box 507.

The status bar may carry an abbreviated version of the sector display of FIG. 3, showing the full display if clicked.

Figure 6:
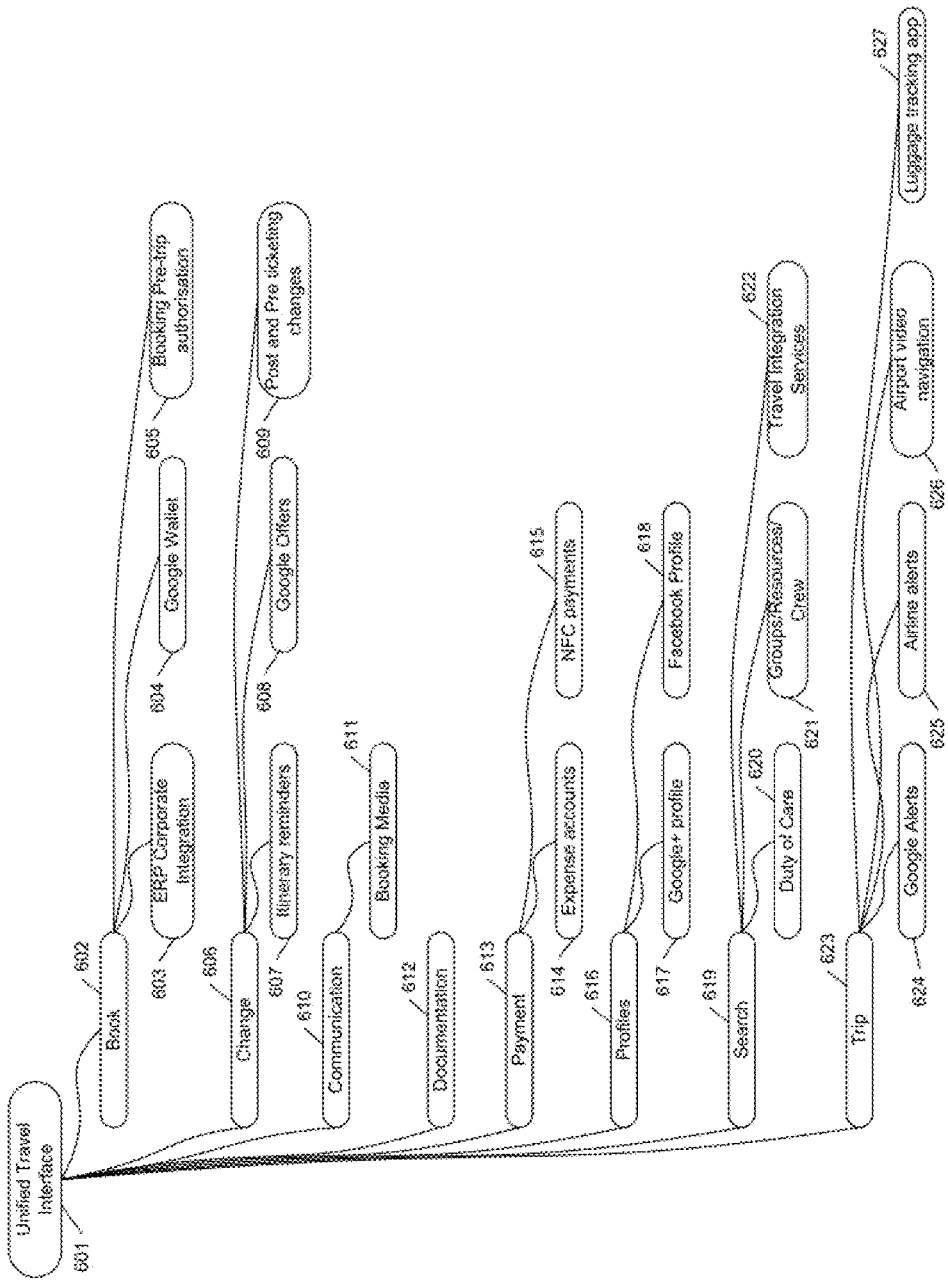
FIG. 6 is a view of some of the facilities available to the booking process.

FIG. 6 more clearly delineates the items found in the backend connections of FIG. 2 item 211. As seen in FIG. 6 the items form a collection 601 which includes booking related items 602 such as the integration 603 with the corporate ERP system, the use of Google Wallet 604 as a payment method and the use of pre-trip authorisation 605 with whichever service provider booking is eventually carried out with. Also included are the ability to change bookings (606) including the itinerary reminders (607) to accept Google Offers 608 which offer savings in the trip, and to implement at 609 pre or post ticketing changes.

The ability to view communications 610 from such as media 611 created by booking providers direct to the traveller can be allowed for, and other documentation from available services can be provided at 612.

Payments 613 while on the trip can be provided from expense accounts 614 for that purpose or by paying by NFC (Near Field Contact) payments 615 from dedicated accounts. The ability also exists to include information from profiles 616 other than the individual and corporate profiles internally held, such as Google+ profiles or profiles held on social services such as Facebook, or with travel booking sites. Typically individual travel profiles include the usual name, address, passport number, citizenship, aircraft meal preferences and seat preferences. Corporate profiles include such things as fare or accommodation levels, cost centre information, role information. The present system proposes to include profiles from social or other useful sites which the traveller belongs to as well as considerably increased personal or company data sufficient to assist to a greater extent in booking travel.

During the search for trip information other information may be offered at 619 including duty of care information from the corporate database, information on groups, resources or crew 621 if the trip forms part of a bulk personnel booking or information from other travel integration services at 622. Messages 623 relating to the trip itself may be derived from Google Alerts 624 on newsworthy matters and airline or country originated alerts 625. Similar sources may also provide video allowing navigation through airports used in the trip at 626 and also applications for tracking tags on luggage at 627.

Figure 7:
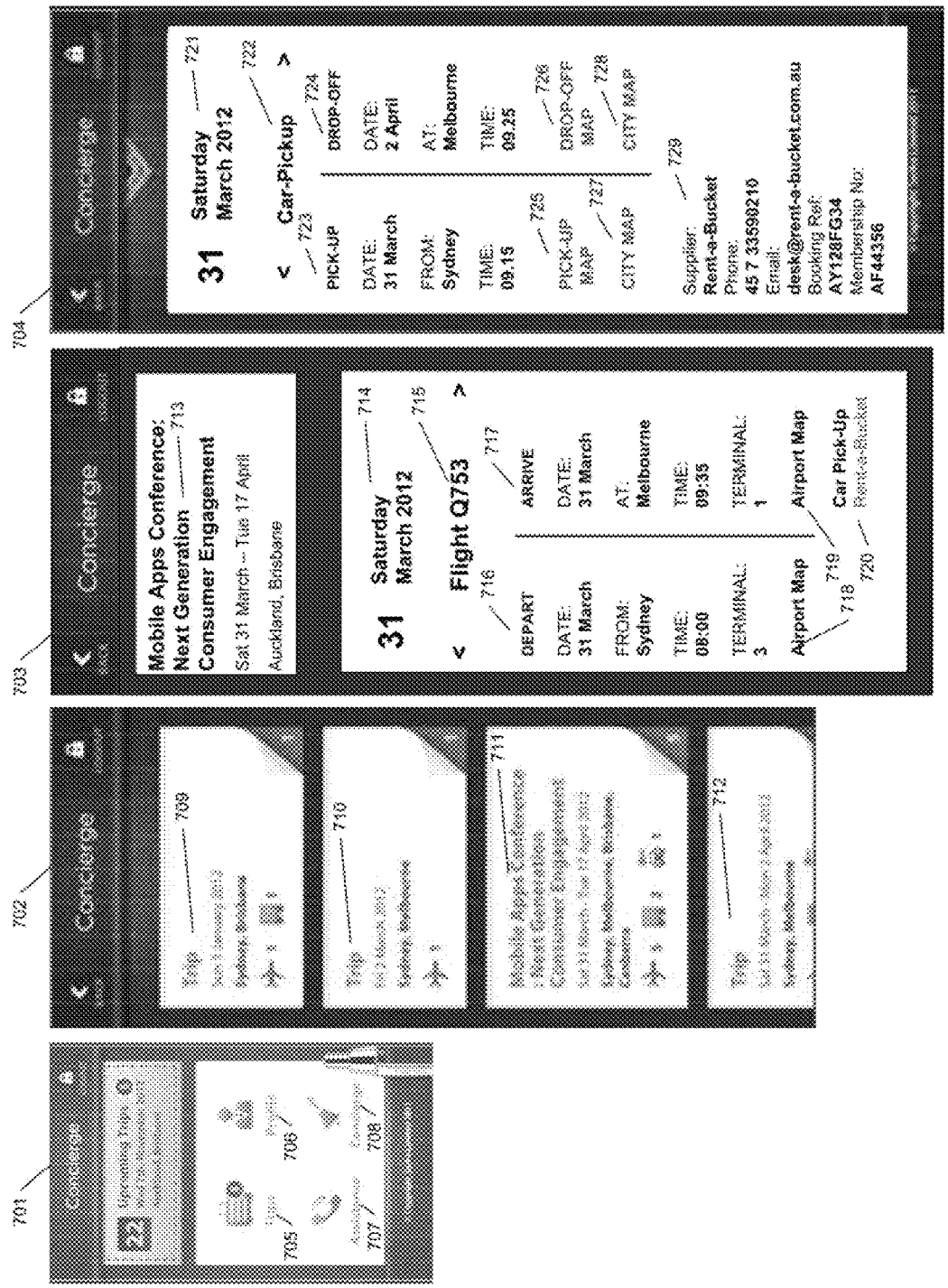
FIG. 7 shows some aspects of the reminder system associated with the travel bookings and monitoring.

FIG. 7 shows some aspects of the reminder system 213 which is associated with the itinerary as stored on the traveller's device. The reminder system on the device ("Concierge") is shown as a smartphone application with a base menu at 701 which includes entry to trips at 705, the users profile at 706, callable assistance at 707 and a concierge service at 708.

Viewing the contents of the trips item 705 at 702 shows a listing of existing trips and associated items, from air trips at 709, 710, 711 to a conference 711 to be held at several venues. Clicking on the conference item 711 brings up the listing 703 which includes at 713 the initial conference data, and below the information for one of the flights associated with the conference.

The flight at 715 is on the date at 714 and has departure information in column 716 and arrival information in column 717. The item 718 in the departure column provides clickable access to either a viewable map or to a video of the airport terminal. In the departure column 717 are an access to an airport map 719 and access to details 720 on a rental car to be picked up at the destination. These details are further shown in item 704 with the pickup date at 721, the item name at 722, the pickup data column at 723, the drop off data in column 724 and the rental company and relevant contact data at 729. Notable are the clickable pick up map 725, drop off map 726 and pick up and drop off city maps 727 and 728.

The application generates reminders for the times appearing in the Concierge entries, as found necessary.

While FIG. 7 shows information only for a flight and car associated trip clearly the Concierge is adaptable to use for accommodation (book-in times, book out times, booking references, discounts, company cost centre reference, etc.). Similarly because the mobile has access to other online services it may provide predictive and/or monitoring recommendations for delays, traffic issues, late arrivals, accidents, amended schedules, etc.

Variations

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected.

For instance while the invention is described in relation to the use of airline travel with associated accommodation it may equally well apply to booking travel, playing ground seats and accommodation for football fanatics to a series of games at different venues.

Similarly while the system is described as a travel booking system it may equally be used to manage and review or monitor existing bookings for a traveller or corporate entity.

INDUSTRIAL APPLICABILITY

The method of the invention is used in the derivation, transfer, correlation and presentation of data to aid in the process of booking travel by providing a traveller with a travel booking interface which is consistent in the input and presentation of the data no matter how derived. This results in the normalised display of information about and relating to the travel in a form which is consistent but which allows easy investigation in depth of the travel results and is therefore time saving for the traveller. The present invention is therefore industrially applicable.

We claim:

1. A travel planning and booking system that communicates with a user device to provide to a user an interface configured to receive at least a search request including basic travel information for a trip to be taken by the traveler, the basic travel information including travel phases, which include a travel origin and a travel destination and any waypoints therebetween, to book the trip for the traveler, the travel booking system comprising:
   one or more servers configured to communicate with the user device and cause the user device to prompt the user to enter the search request including the basic travel information and transmit the search request including the basic travel information to the one or more servers and to display results generated by the servers in a search interface that comprises a first interface and at least a second interface on a screen of the user device,
   the one or more servers further configured to receive the search request including the basic travel information from the user device, and still further configured to operate as:
      a traffic interceptor that communicates with travel providers and conducts an initial query of the travel providers based on the basic travel information received from the user device, and
      a booking system provider, interfaced with the traffic interceptor and configured to conduct a supplementary query of the travel providers, the supplementary query being separate from the initial query and based on the basic information and at least one item of supplementary information,
   the at least one item of supplementary information received from at least one of: a traveler profile, a corporate profile, a backend connection providing ancillary information relating to at least one of the travel phases, and a route micro-mapper that conducts a localized query of travel providers relating to travel local to each phase of the travel phases of the proposed travel between the travel origin and the travel destination,
   wherein the travel planning and booking system is configured to generate at least one solution for each of the travel phases, and to present to the user, via the first interface, the at least one solution for each of the travel phases in a consistent format in the interface,
   wherein the first interface presents a first output from the traffic interceptor in the consistent format, and the second interface presents a second output from the booking system provider in the consistent format, the first interface and the second interface located adjacently to one another on the screen of the user device,
   wherein the first interface, through the travel planning and booking system, converts the first output from the traffic interceptor pursuant to the initial query from one or more first formats of the first output to the consistent format for presentation to the user via the interface,
   wherein the second interface, through the travel planning and booking system, converts the second output from the booking system provider pursuant to the supplementary query from one or more second formats of the second output to the consistent format for presentation to the user via the interface,
   wherein the search interface allows the user to select between (a) the first output presented on the first interface and (b) the second output presented on the second interface, in order to allow the user to replace the first output with a selected output from said second interface, and
   wherein the booking system provider is configured to, once all the phases of travel have been confirmed by the user, to make the bookings and create and store at least one of a travel itinerary and a reminder system in relation to the travel.

2. The travel planning and booking system as claimed in claim 1, wherein the interface allows the user to select at least a part of the first output to be replaced by at least a part of said second output by clicking on the second output.

3. The travel planning and booking system as claimed in claim 1, wherein the at least one item of supplementary information is received from the traveler profile, and the traveler profile comprises information identifying established traveler requirements for different required facilities in a manner usable as a filter to the booking process.

4. The travel planning and booking system as claimed in claim 1, wherein the at least one item of supplementary information is received from the corporate profile, and the corporate profile comprises information of corporate requirements for different required facilities in a manner usable as a filter to the booking process.

5. The travel planning and booking system as claimed in claim 1,
   wherein the at least one item of supplementary information includes traveler advisory information received from the backend connection, and
   wherein the interface further comprises a message interface configured to present, in the consistent format, output from the booking system provider comprising the traveler advisory information.

6. The travel planning and booking system as claimed in claim 1,
wherein the at least one item of supplementary information includes loyalty scheme information received from the backend connection, and
wherein the booking system provider is configured to, once all the travel phases have been confirmed by the user, implement the loyalty scheme information in relation to the travel.

7. The travel planning and booking system as claimed in claim 1, wherein said at least one of the travel itinerary and the reminder system is configured as a smartphone application.

8. The travel planning and booking system as claimed in claim 1, wherein said at least one of the travel itinerary and the reminder system comprises at least one map associated with at least one of the travel origin, the travel destination, and a waypoint between the travel origin and the travel destination.

9. The travel planning and booking system as claimed in claim 4, wherein the booking system provider is configured to, once all the travel phases have been confirmed by the user via the interface, query an enterprise resource planning system associated with the user to confirm that the at least one solution to each of the travel phases meets corporate policies or requirements.

10. The travel planning and booking system as claimed in claim 1, wherein the booking system provider is further configured to conduct an ancillary query of travel providers during the traveler's travel.

11. The travel planning and booking system as claimed in claim 1, wherein each item of the basic information includes a weighting, the weighting determining a relevance of each requirement in an ordering of the at least one solution.

12. The travel planning and booking system as claimed in claim 1,
wherein the travel phases of the basic travel information further include one or more waypoints between the travel origin and the travel destination,
wherein said travel planning and booking system is configured to provide the at least one solution for each of the travel origin, the travel destination, and the one or more waypoints,
wherein the at least one solution corresponds to a proposed itinerary for travel between the travel origin and the travel destination through at least one of the one or more waypoints, and
wherein the at least one solution corresponds to a proposed itinerary for travel between the travel origin and the travel destination through one or more of the one or more waypoints.

13. A travel planning and booking apparatus for facilitating booking of travel via a user interface of a user device, comprising:
a server configured to communicate with said user device and cause the user device to prompt the user to enter a travel request and transmit the travel request to the server and to display results generated by the server in a search interface that comprises a first interface and at least a second interface on a screen of the user device,
the server configured to receive the travel request from the user device, and said travel request including at least a basic travel information comprising different phases of travel including at least a travel origin and a travel destination,
the travel planning and booking apparatus configured to operate as:
a traffic interceptor that conducts an initial query of internet connected sites based on the basic travel information, and
a booking system provider, interfaced with the traffic interceptor and programmed to conduct a refined query of the internet connected sites, the refined query being separate from the initial query and based on the basic travel information and at least one item of supplementary information,
wherein the travel planning and booking apparatus is configured to receive solution data from the internet connected sites, resolve the solution data received from the internet connected sites into a consistent format, and output the solution data to the user device, in the consistent format, as one or more solutions to the travel request,
wherein the travel planning and booking apparatus converts the solution data received in the one or more different formats from the internet connected sites into the consistent format for output to the user device as the one or more solutions to the travel request,
wherein the booking system provider, interfaced with the traffic interceptor, conducts a supplementary query of the travel providers, the supplementary query being separate from the initial query and based on the basic travel information and the at least one item of supplementary information,
the at least one item of supplementary information received from at least one of: a traveler profile, a corporate profile, a backend connection providing ancillary information relating to at least one of the travel phases, and a route micro-mapper that conducts a localized query of travel providers relating to travel local to each phase of the travel phases of the proposed travel between at least one of the travel origin and the travel destination,
wherein the travel planning and booking system is configured to generate at least one solution for each of the travel phases, and to present to the user, via the first interface, the at least one solution for each of the travel phases in the consistent format,
wherein the first interface presents a first output from the traffic interceptor in the consistent format, and the second interface presents a second output from the booking system provider in the consistent format, the first interface and the second interface located adjacently to one another on the screen of the user device,
wherein the first interface, through the travel planning and booking system, converts the first output from the traffic interceptor pursuant to the initial query from one or more first formats of the first output to the consistent format for presentation to the user,
wherein the second interface, through the travel planning and booking system, converts the second output from the booking system provider pursuant to the supplementary query from one or more second formats of the second output to the consistent format for presentation to the user,
wherein the search interface allows the user to select between (a) the first output presented on the first interface and (b) the second output presented on the second interface, in order to allow the user to replace the first output with a selected output from said second interface, and wherein the booking system provider is configured to, once all the phases of travel have been confirmed by the user, make the bookings and create and store at least one of a travel itinerary and a reminder system in relation to the travel.

14. The travel planning and booking apparatus as claimed in claim 13, wherein the travel request information from the user is augmented by profile information relevant to the travel request and stored in at least one profile store accessible to the travel booking apparatus.

15. The travel planning and booking apparatus as claimed in claim 14, wherein the profile information relevant to the travel request is stored in at least one individual traveler profile.

16. The travel planning and booking apparatus as claimed in claim 15, wherein the individual traveler profile is stored in a social site profile.

17. The travel planning and booking apparatus as claimed in claim 14, wherein the profile information is stored in a corporate profile.

18. The travel planning and booking apparatus as claimed in claim 13, wherein the basic travel information further includes one or more waypoints between the travel origin and the travel destination, wherein said travel booking apparatus is configured to provide at least one solution for each of the travel origin, the travel destination, and the one or more waypoints, and wherein the at least one solution corresponds to a proposed itinerary for travel between the travel origin and the travel destination through one or more of the one or more waypoints.

19. The travel planning and booking apparatus as claimed in claim 13, wherein the travel request further includes any one of facilities required at the travel origin or the travel destination, and required times at the travel origin or the travel destination.

20. The travel planning and booking system as claimed in claim 1, wherein the selected output is selected by the user by clicking thereon to replace the first output with the selected output.

* * * * *